Sept. 30, 1941. E. ALMDALE 2,257,664
AUTOMOBILE FRAME AND STRUCTURAL MEMBER
Filed March 21, 1940 3 Sheets-Sheet 3
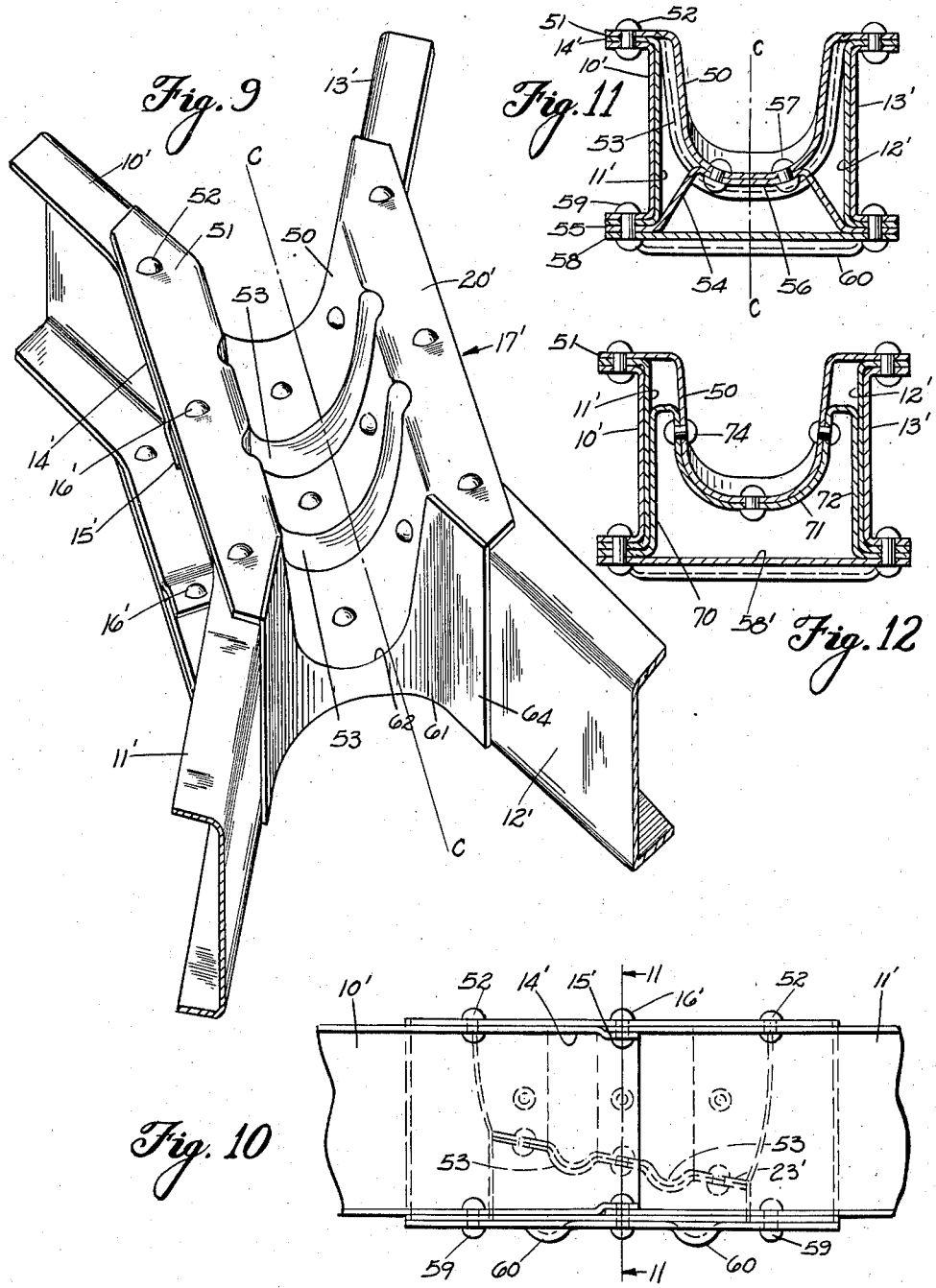
INVENTOR.
EINAR ALMDALE
BY
ATTORNEY.

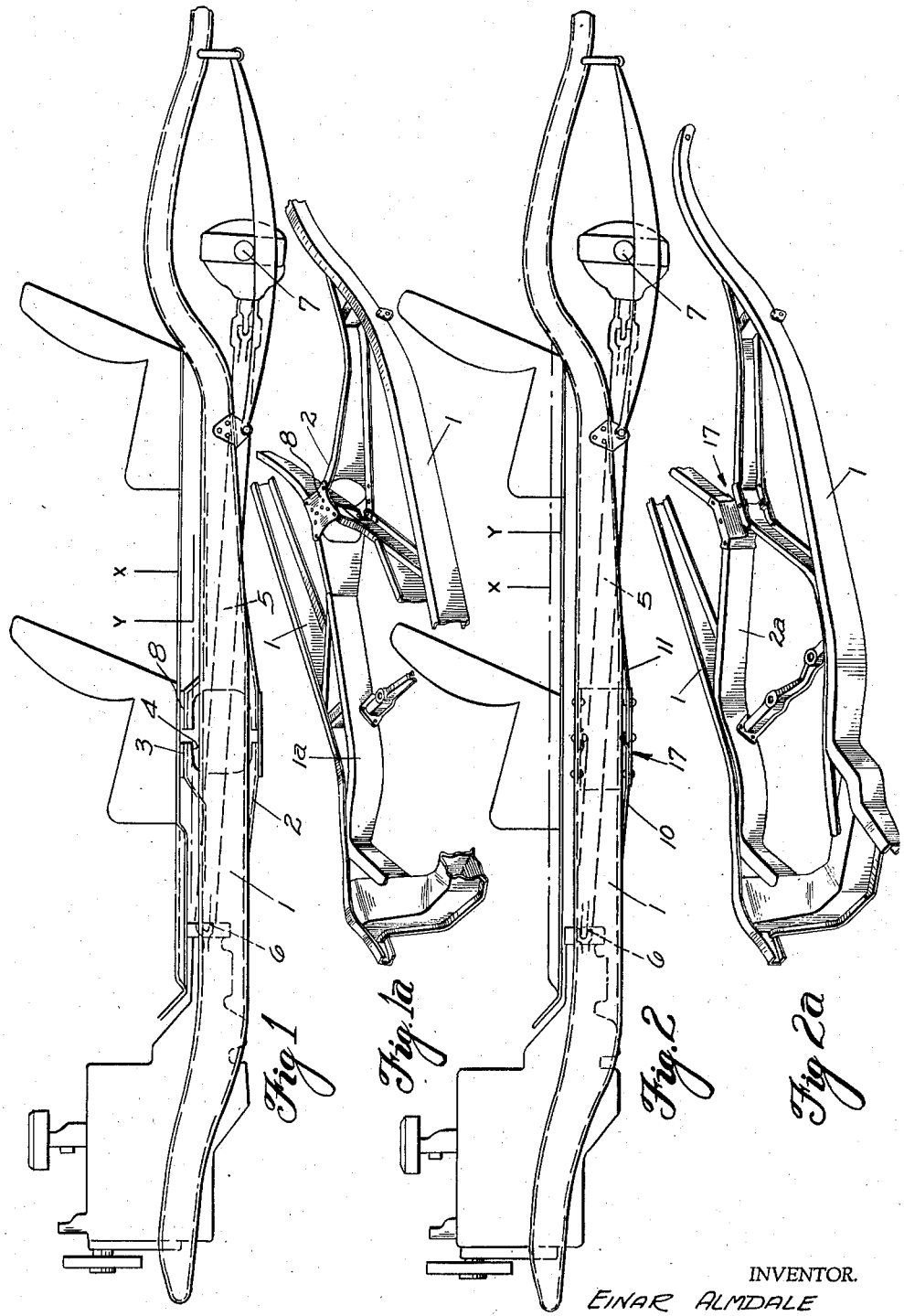

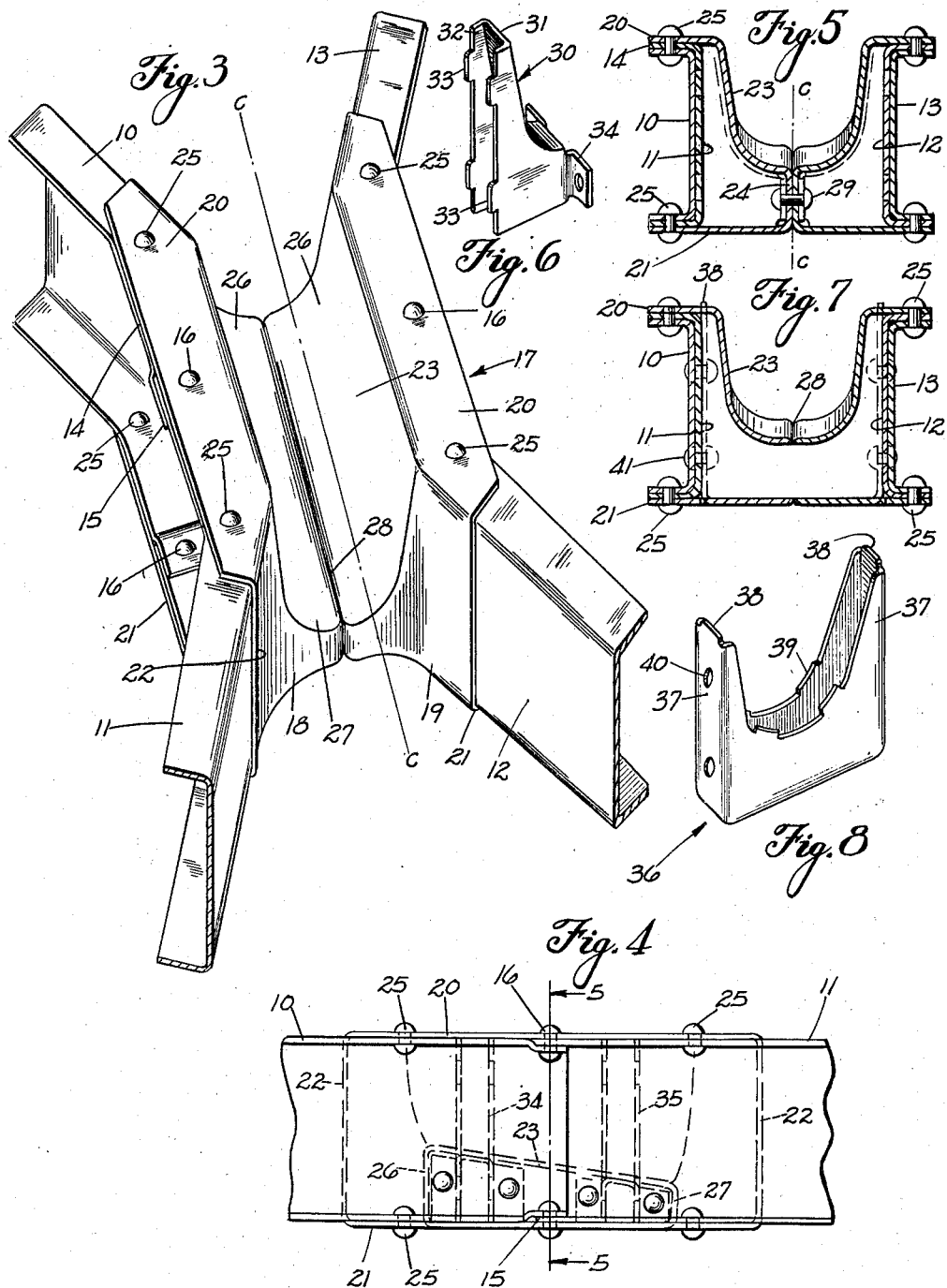

Patented Sept. 30, 1941

2,257,664

UNITED STATES PATENT OFFICE 2,257,664

AUTOMOBILE FRAME AND STRUCTURAL MEMBER

Einar Almdale, Detroit, Mich., assignor to The Midland Steel Products Company, Cleveland, Ohio, a corporation of Ohio Application March 21, 1940, Serial No. 325,212

19 Claims. (Cl. 280—106)

This invention relates to new and useful improvements in automobile frames of the type employing an X-shaped or cruciform member connecting the two longitudinal side rails, and an important object of the invention is to provide an X-member construction by which the tunnels in the floor of passenger compartments of the vehicle can be eliminated and the floor level and center of gravity of the vehicle can be lowered.

Another important object of the invention is to provide an intersection for the X-member which will effectively transmit stresses diagonally across the center of the intersection and through the arms of the member from one side rail to the other, while the intersection has an open, unobstructed top allowing propeller shaft movement and general overall reduction of space or depth of the intersection.

Another object of the invention is to provide an intersection member of generally U-shape and of hollow construction, the arms of the X-member cooperating with the vertical arms of the member in forming it into hollow closed box section.

Other objects and advantages of the invention will become apparent during the course of the following description.

In the accompanying drawings forming a part of the application and wherein like numerals are employed to designate like parts throughout the several views, Fig. 1 is a side elevation of an automobile chassis embodying the usual X-member.

Fig. 1a is a fragmentary perspective view thereof,

Fig. 2 is a similar view of a chassis including the new form of X-member which enables the floor of the automobile in the passenger compartment to be lowered from the line X in Fig. 1 to the line Y.

Fig. 2a is a fragmentary perspective view of the same.

Fig. 3 is an enlarged perspective view of the X-member showing the improved form of intersection.

Fig. 4 is a side elevation of the same.

Fig. 5 is a transverse section of the same taken on the line 5—5 of Fig. 4.

Fig. 6 is a perspective view of the reinforcement used therein,

Fig. 7 is a transverse section of a modified form of Fig. 5,

Fig. 8 is a perspective of a modified form of reinforcement which extends entirely across the intersection member, Fig. 9 is an enlarged perspective view of a modified form of the intersection member, Fig. 10 is a side elevation of the same, Fig. 11 is a transverse section taken on the line 11—11 of Fig. 10.

Fig. 12 is a transverse section of a modified form of the modification shown in Fig. 11.

Referring now more particularly to Figs. 1 and 2 of the drawings, Figs. 1 and 1a represent a side elevation of the chassis of a 1940 model automobile having the usual longitudinally extending side rails 1 connected by the usual X-shaped cross member 2 located at approximately the middle of the side rails. This X-shaped member has its intersection member 3 vertically enlarged for strength and to provide enlarged openings 4 at the intersection for the passage and movement of the propeller shaft 5. This propeller shaft is connected with the drive shaft by a universal joint 6 allowing vertical movements of the rear axle 7 and differential hypoid type of gearing. In order to obtain proper strength for the X-member, its arms at their inner ends are vertically enlarged and are provided with clearance openings 4 therein covered and closed by a horizontal gusset 8. Since the intersection piece of the X-member cannot be lowered due to road clearance, the floor X is disposed at a considerable distance above the tops of the side rails, or is provided with longitudinally extending raised portions or tunnels extending along the longitudinal center line of the passenger compartment. In the type of X-member shown in Figs. 1 and 1a, it has been found that the frame is stronger if the auxiliary side rails 1a diverge rearwardly from points slightly rearward of the front cross member so as to be spaced from the side rails throughout the major portions of the auxiliary rails. However, with the type of X-member shown in the remaining figures, the frame is made stronger by having the auxiliary rails 2a throughout the major portions of their length, abut and be secured to the side rails to form them into box section for most of the distance between the forward cross member and back to about the dash line of the frame.

It is therefore the purpose of this invention to strengthen this type of frame and also to so form the intersection of the X-member that its top can be disposed considerably lower than the tops of the usual intersections of X-members with the desirable result of enabling the floor of the automobile to be lowered to approximately the line Y as shown in Figs. 1 and 2 and eliminate the provision of tunnels. In other words, the floor may be lowered a distance equal to that between the upper edge of the propeller shaft clearance openings 4 and the top surface of the usual X-member intersection.

The novel form of X-shaped member employed in Fig. 2 is formed from four outwardly facing channel shaped arms radiating from a common point located on the longitudinal center line c—c of the automobile frame in cruciform relation. The two arms 10 and 11 on one side of the X-member are connected to the side rail along one side of the automobile frame and converge inwardly toward the center of the frame up to predetermined points where their ends 14 are deflected or bent from their general plane to lie substantially parallel to the longitudinal center line of the frame and be overlapped as at 15 and riveted together as at 16. The other two arms 12 and 13 of the X-member are connected with the other side rail of the automobile frame and are similarly disposed so that when in assembled relation, the arms 11 and 13 are in longitudinal alignment as are the arms 10 and 12 so as to most effectively transmit stress and whereby the arms 10 and 13 diverge forwardly of the frame for connection with the two side rails, while the two rear arms 11 and 12 diverge rearwardly of the frame to be connected to the side rails in proximity to the rear kickups. It will of course be obvious that each pair of sections or arms 10 and 11 or 13 and 12 may be formed from a single length of channel section having its intermediate portion taking the place of the overlapped portions of two separate arms.

The intersection member designated in its entirety by the numeral 17 which connects the four arms of the X-member together into a unitary structure, is of generally U-shaped configuration in cross section with its open side arranged uppermost with reference to the X-member so as to provide ample propeller shaft clearance through an X-member without unduly raising the floor level of the automobile. This intersection member is of practically the same height or depth as the inner ends of the four arms of the X-member and may be formed in several different ways. In the various figures, it will be noted that the top of the intersection member is arranged no higher than the top plane of the side rails.

One way of providing this U-shaped intersection 17 is to form it, as shown in Figs. 3, 5 and 7, from two stampings 18 and 19, each of which is drawn out from a flat plate into a substantially L-shape hollow section, in cross section. This presents each stamping or section with an open sided box-shape having an upper flange 20 and a lower flange 21 which embrace and are riveted over the flanges of the X-member arms. The vertical transverse ends 22 of this formation are bowed inwardly to coincide with the angularity of the X-member arms. The top 23 of the hollow section forms the vertical leg of the L-shaped section and is spaced laterally a distance from the overlapped portions of the X-member arms as best appreciated from Fig. 5. This top 23 is curved inwardly and downwardly to extend substantially horizontally and to merge into the innermost vertical wall 24 of the horizontal leg of the L-shaped conformation. The bottom of each stamping 18 and 19 is disposed horizontally and is continuous from the inner vertical wall 24 to the flange portion 21 thereby providing a hollow section having five closed walls and a sixth open side which is of course closed by the X-member arms which are riveted with the rivets 25 to the flanges 20 and 21 of the intersection member to form it into a completely closed hollow L-shaped section. The horizontal leg of each hollow section is deeper at its forward end 26 than at its lower rear end 27 to adapt it to the inclination of the propeller shaft 5. The two inner vertical walls 24 of the two sections are abutted and are welded together in a continuous line as indicated at 28 around their four sides. The two vertical walls 24 are also riveted together by the rivets 29 which assist in locating parts for the subsequent welding operation as well as to provide for a stronger union between the two sections.

The vertical leg of the U-shaped intersection may be torsionally reinforced by the insertion of pairs of channel members 30 of L-shaped configuration prior to the attachment of the intersection member to the four arms of the X-member. These channel reinforcements each comprise a web portion 31 with a pair of parallel flanges 32, the free edges of which are provided with integral welding tongues 33. These flanges are also provided with lateral lugs or feet 34 extending from opposite sides thereof to abut and be secured to the vertical portions 24 of the U-member by means of the rivets 29. It will thus be apparent that the reinforcement may be inserted through the open side of the intersection member until the feet 34 abut the vertical portions 24 of the U-member and the web of the reinforcement lies flush against the under surface of the top 23. When the intersection member is secured to the arms of the X-member, slots in the X-member arms receive the welding projections 33 and after assembly may be welded around the edges of the slots, if desired. These L-shaped reinforcements 30 are arranged in aligned pairs transversely across the intersection member with one pair 34 arranged adjacent one end of the intersection member while the other pair 35 is arranged at the opposite end thereof as shown in dotted lines in Fig. 4.

Instead of disposing a pair of L-shaped reinforcements 30 at each end of the intersection member, a single reinforcement 36, shown in Figs. 7 and 8 may be employed. The reinforcement is of channel shape and of U-shaped configuration so that it can be assembled with the intersection member by sliding it vertically through a rectangular opening provided in the bottom thereof, as the vertical walls 24 thereof at this area are also removed whereby the arms 37 of the U-shaped reinforcement may be snugly received between the arms of the X-member and the inner curved portions 23 of the intersection member with welding projections 38 at their upper ends disposed in slots in the flanges 20 to be subsequently welded after assembly. Likewise the curved edges of the reinforcements may be provided with similar welding projections 39 adapted to project through slots in the curved top 23. The web portions of the reinforcements may be provided with apertures 40 to receive rivets 41 of the type which can be inserted and headed from the exterior of the structure. When this form of reinforcement is employed, one is disposed at each end of the intersection member in the position shown by the dotted lines 34 and 35 of Fig. 4.

In the modification shown in Figs. 9 to 12 inclusive, the intersection member instead of being formed from drawn pieces, is formed from a plate construction. Parts corresponding with those in the preceding modification are designated with corresponding primed reference numerals.

The intersection member 17' in this instance is composed primarily of a plate 50 bent into U-shape with the arch of the U disposed down between the arms of the X-member and provided with oppositely extending horizontal flanges 51 which are secured upon the tops of the overlapping flanges of the X-member arms by means of rivets 52. It will be noted that the vertical arms of this plate 50 are spaced from the webs of the X-member arms to provide a hollow section. The plate 50 adjacent each end may be provided with pressed out transversely extending reinforcing ribs 53, the portions of which adjacent the upper portion of the U configuration, engage the web portions of the X-member arms as best seen in Fig. 11.

To increase the torsional resistance of the arms of the U-shaped intersection member, an inverted U-shaped plate 54 has its oppositely disposed flanges 55 secured to the lower flanges of the X-member arms with the intermediate arched portion 56 conforming to, abutting and secured to the arched portion of the plate 50 by means of rivets 57 or any other suitable type of fastening elements. The sides of this arched portion are inclined inwardly and upwardly from its flanges 55 toward the longitudinal center line of the intersection member and automobile frame to form the vertical arms of the intersection member into hollow closed box section. The horizontal portion of the U-intersection is formed into closed box section by bottom closing plate 58 which is secured to the flanges 55 and the flanges of the X-member arms by means of common rivets 59. This plate 58 is provided at intervals with pressed out reinforcing ribs 60. The ends of the intersection members are closed by vertical plates 61, each having a U-shaped cutout portion 62 conforming to the curvature of the U-shaped plate 50 and having the edges of the cutout portion welded as at 62 to the edge of plates 50. Each end plate 61 is bowed inwardly and transversely to provide the ends with vertical wing portions 64 disposed flush against the webs of the X-member arms to be welded thereto in any suitable manner.

The modification shown in Fig. 12 is practically the same as that shown in Fig. 11 except that the insert reinforcing member 70 has a more extensive arched portion 71 to extend further up into the intersection member. Instead of having the upwardly and inwardly inclined portions as in Fig. 11, the sides 72 of the reinforcement 70 abut the web portions of the X-member arms throughout the major portions of their height and are secured thereto in any suitable manner. Rivets 74 are employed for securing the arched portion of the reinforcing member to the arched portion of the plate 50. A bottom closing plate 58' is also employed in this modification and is of the same construction as that described for Fig. 11 to form the intersection member into a completely closed hollow box section of U-shaped configuration.

In all of these modifications, it will be obvious that a U-shaped cradle intersection member is provided for the X-member which has an open unobstructed top or lengthwise channel in which the propeller shaft of the automobile has all of the required freedom of movement, without the necessity of vertically enlarging the intersection and without bridging the upper flanges of the X-member arms with gusset plates and the like which naturally have to be arranged in a manner giving the intersection greater height and therefore necessitate the provision of tunnels or raised portions in the automobile floor.

It will be understood that various changes in the size, shape and relation of parts may be resorted to without departing from the spirit of the invention or the scope of the appended claims.

I claim:

1. A structural member for vehicle frames comprising four arms converging in cruciform relation, of a connector for said arms comprising an open top torsion resisting U-shaped hollow section member constituting the sole means for connecting the arms together as a unit with the arch of said member extending downwardly between said arms to present an open top for the extension and movement of a propeller shaft.

2. A structural member for vehicle frames comprising four arms, and an intersection member connecting said arms in cruciform relation and being of U-section to present an open top for the extension of a propeller shaft, and the vertical sides and horizontal bottom of said member being formed into hollow closed section.

3. A structural member for vehicle frames comprising four arms, an intersection member connecting the arms in cruciform relation and comprising a pair of sections, each section being of L-shaped hollow section and having one side wall open, said sections having their hollow horizontal arms welded together in alignment with their vertical hollow arms spaced apart to present an open top U-shaped member, and said X-member arms being secured to the open sides of said hollow sections to form them into entirely enclosed hollow section.

4. A structural member for vehicle frames comprising an intersection member of U-shape with the longitudinal axis of the arch lengthwise of the longitudinal center line of the frame to present an open top for the extension of a propeller shaft, and X-member arms cooperating with the vertical sides of the U-shaped member to form hollow vertical sections therewith.

5. A structural member for vehicle frames comprising four arms, and an intersection member connecting said arms in cruciform relation and being of U-shaped with the longitudinal axis of the arch lengthwise of the longitudinal center line of the frame to present an open top for the extension of the propeller shaft, said X-member arms cooperating with the vertical sides of the U-shaped member to form hollow vertical sections therewith, and the bottom of the U-shaped intersection member being of hollow section.

6. A structural member for vehicle frames comprising four arms, an intersection member connecting the arms in cruciform relation and being of U-shape with the longitudinal axis of the arch lengthwise of the longitudinal center line of the frame to present an open top for the extension of a propeller shaft, and the vertical sides and horizontal bottom of said member being of hollow closed section, and a reinforcement secured transversely within said closed section and engaging the spaced vertical walls thereof.

7. A structural member for vehicle frames comprising four arms arranged in cruciform relation, a plate formed into U-shape with its inverted arch disposed downwardly between said arms with its U-shape opening upwardly, the longitudinal margins of said plate being secured to said arms, and a gusset plate secured to and bridging the space between said arms beneath said arch of said U-shaped plate.

8. A structural member for vehicle frames comprising four arms arranged in cruciform relation, a plate formed into U-shape arranged between said arms with the longitudinal margins of said plate secured to said arms, a gusset plate secured to and bridging the space between said arms beneath said U-shaped plate, and said U-shaped plate having ribs pressed in the same and engaging said arms to reinforce the arms of the U-section against torsional stress.

9. A structural member for vehicle frames comprising four arms arranged in cruciform relation, a plate formed into U-shape arranged between said arms with the longitudinal margins thereof secured to said arms, an inverted U-plate having its arch abutting and secured to the arch of the first named U-plate and its margins secured to said arms, and a bottom plate bridging the space between said arms to form a completely closed U-shaped box section.

10. A structural member for vehicle frames comprising four arms, an intersection member connecting the arms in cruciform relation and comprising a pair of like drawn stampings of L-shaped hollow section having one side wall open, said stampings having their horizontal arms welded together in alignment and their vertical arms spaced apart to present a U-shaped open top member, said X-member arms being secured to the open sides of said hollow stampings to form them into entirely enclosed box sections, and channel shaped inserts secured transversely within said hollow stamping and substantially filling the cross sectional area of the same.

11. An automobile frame comprising a pair of longitudinal spaced side rails, a front cross member connecting the rails, an X-shaped member located at approximately the center of the frame and a substantial distance rearwardly of said forward cross member and comprising a plurality of arms converging toward a common point to form an intersection member, a closed section open top cradle member forming the sole means connecting said arms together in cruciform relation to provide the intersection member with an open unobstructed top for the reception of a propeller shaft, and said side rails between the forward cross member and the forward ends of the X-member arms being of completely closed box section.

12. A structural member comprising a pair of outwardly facing channel sections having portions of their webs pressed out into lateral hollow extensions lengthwise thereof, said extensions abutting lengthwise and being secured together, and channel members nested in said channel sections and spaced from the webs thereof to form said sections into closed hollow sections.

13. A structural member comprising a pair of outwardly facing channel sections having portions of their webs pressed out into lateral hollow extensions lengthwise thereof, said extensions abutting lengthwise and being secured together, the ends of said sections being flared outwardly thereof in outwardly diverging relation, and channel members nested in said channel sections and having offset portions closely nesting in said flared ends to form said sections into closed hollow sections.

14. A structural member for automobile frames comprising a U-shaped member having its arms provided with lateral flanges, a pair of spaced apart channeled members between which the arch of the U-member is disposed and having their upper flanges secured to said lateral flanges, and a member secured to the lower flanges of said channeled members to form the structural member into hollow section the arch of the U-member providing an upwardly opening groove for the clearance of the propeller shaft.

15. A structural member comprising a U-shaped member having its arms provided with lateral flanges, a pair of channel members between which the arch of the U-member is disposed and having their upper flanges secured to said lateral flanges, and a member secured to the lower flanges of said channel members and having a part offset between said channel members and secured to the arch portion of said U-shaped member.

16. In an automobile frame structure, an intersection piece for a plurality of radiating arms comprising a member box-shaped in cross section and having its top provided with a depressed wide groove extending longitudinally of the member and the groove being of a depth at least one-half the depth of the member to provide for propeller shaft clearance.

17. An automobile frame structural member comprising a pair of members of channel section having spaced substantially parallel portions with the lower web portions and lower flanges thereof bowed inwardly out of their respective normal planes toward each other and secured together to cause the upper web portions and upper flanges of the pair of members to define an open top groove lengthwise thereof for reception of the propeller shaft.

18. A structural member comprising a pair of closed section juxtaposed forms, the lower portions of adjacent faces of the forms each provided with a longitudinally extending lateral extension, said extensions being abutted and secured together to space the upper portions of the forms apart and to provide a groove at the tops of said forms extending longitudinally therebetween.

19. A structural member for vehicle frames comprising a pair of substantially L-shaped hollow forms arranged with their horizontal arms lowermost and extending toward each other in the same plane and with the ends of the arms abutted and secured together and the vertical stems of the L-shaped hollow forms being spaced apart to form a groove for propeller shaft clearance extending lengthwise of said forms and between the upper ends thereof.

EINAR ALMDALE.